United States Patent
Taylor et al.

(10) Patent No.: US 8,237,968 B2
(45) Date of Patent: Aug. 7, 2012

(54) PARALLELIZATION IN PRINTING

(75) Inventors: Robert B. Taylor, Washougal, WA (US); Larry Mull, Corvallis, OR (US); Jon Derek Roller, Corvallis, OR (US); David Edward Staas, Camas, WA (US); Mark Ronald Newsome, Corvallis, OR (US); Christopher R. Kempke, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 12/466,862

(22) Filed: May 15, 2009

(65) Prior Publication Data

US 2010/0290078 A1 Nov. 18, 2010

(51) Int. Cl.
*G06F 15/00* (2006.01)
*G06F 15/16* (2006.01)

(52) U.S. Cl. .................................. 358/1.15; 709/217
(58) Field of Classification Search .................. 358/1.15
See application file for complete search history.

(56) References Cited

U.S. PATENT DOCUMENTS

| | | | |
|---|---|---|---|
| 5,692,112 | A | 11/1997 | Brady |
| 6,559,958 | B2 | 5/2003 | Motamed et al. |
| 6,722,279 | B2 | 4/2004 | Wiedemann |
| 7,298,503 | B2 | 11/2007 | Christiansen et al. |
| 7,336,380 | B2 | 2/2008 | Eisele |
| 2003/0007167 | A1 | 1/2003 | Catt et al. |
| 2004/0119997 | A1 | 6/2004 | Christiansen |
| 2005/0240745 | A1 | 10/2005 | Iyer et al. |
| 2006/0061794 | A1 | 3/2006 | Ito et al. |
| 2007/0070375 | A1 | 3/2007 | Owen |
| 2007/0159655 | A1* | 7/2007 | Cui ............................ 358/3.01 |
| 2008/0270402 | A1* | 10/2008 | Inoue et al. ...................... 707/7 |
| 2008/0273218 | A1 | 11/2008 | Kitora et al. |

* cited by examiner

*Primary Examiner* — Saeid Ebrahimi Dehkordy

(57) ABSTRACT

Disclosed are various embodiments of various systems that facilitate the printing of documents. In one representative example, one arrangement includes a plurality of raster image processors, a plurality of frame brokers, and a first digital switch facilitating communication between the raster image processors and frame brokers. The arrangement also includes a plurality of printers and a second digital switch facilitating communication between the frame brokers and the printers. A central control system orchestrates a progression of frames of a plurality of documents through the raster image processors and the frame brokers to the printers.

20 Claims, 4 Drawing Sheets

PARALLELIZATION IN PRINTING

BACKGROUND

In high speed commercial printing installations, multiple printers may be employed that print at relatively high speeds. Such high speed printers may print frames of data that are relatively large pages typically printed in commercial printing environments. Such high speed printing requires that frames be processed and fed to the printers in a timely fashion so as to avoid an interrupt in a run of printing.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following description sets forth various steps and/or operations that may be performed by various computer components. It is understood that such components may be grouped in a single location or distributed over a large area. Such components may include, for example, computer processing devices, memory devices (including storage devices), display devices, input devices, and other systems and devices. Where such components may be distributed, they may communicate with each other over various networks or other communications links.

Figure 1:
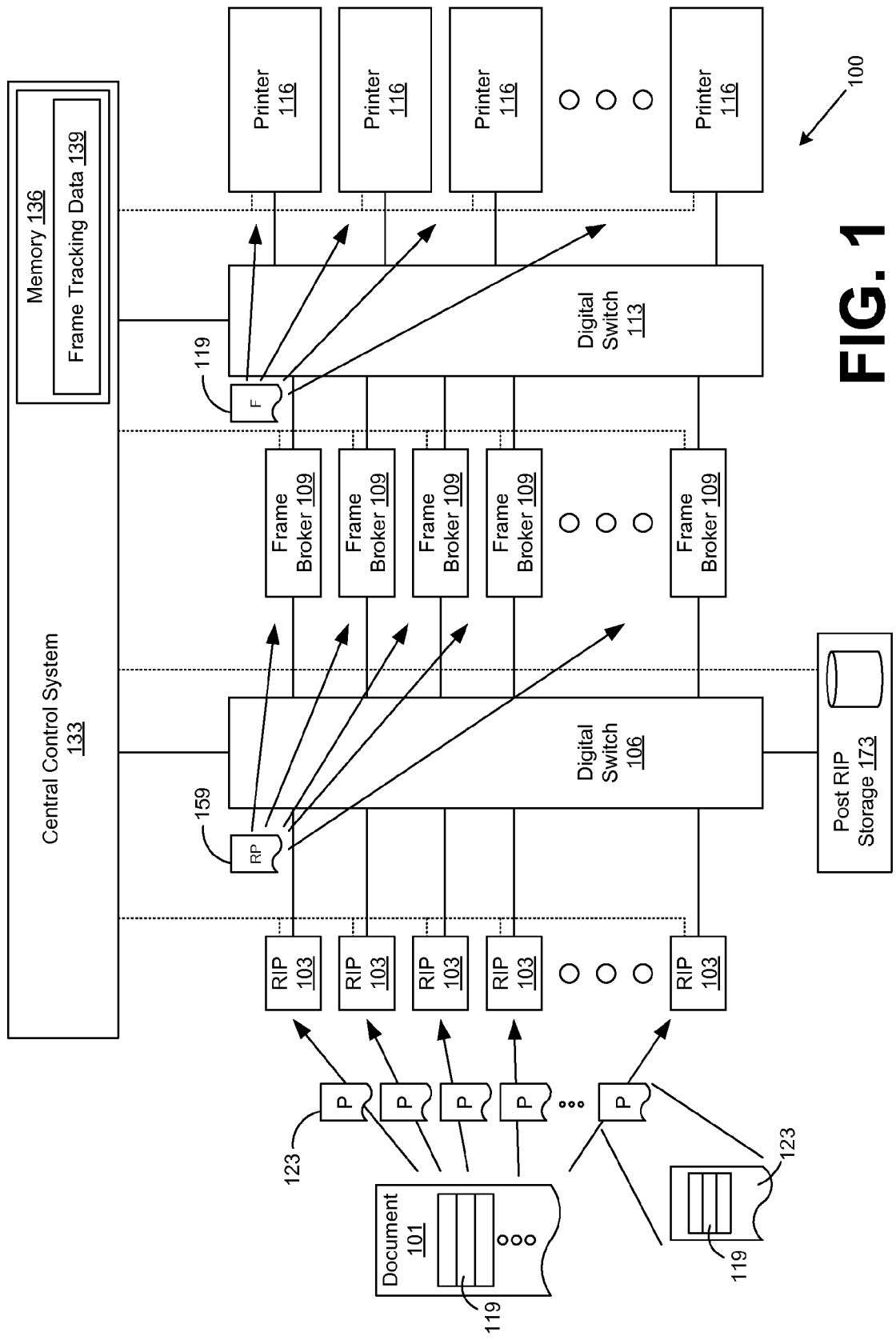
FIG. 1 is a drawing of a print network according to an embodiment of the present disclosure.

With reference to FIG. 1, shown is a print network 100 according to various embodiments. The print network 100 is employed to implement the raster image processing of one or more documents 101 for printing as will be described. The print network 100 includes various components such as raster image processors 103 that are in data communication with a digital switch 106. The digital switch 106 is coupled to several frame brokers 109. The frame brokers 109 are employed for temporary storage of items as will be described. Each of the frame brokers 109 may coupled to a digital switch 113. The digital switch 113 is also coupled to a number of printers 116 as shown.

Alternatively, in another embodiment, each of the frame brokers 109 may be coupled directly to one of the printers 116, where the digital switch 113 is not used.

Each of the raster image processors 103 may be implemented on one or more servers that are electrically coupled to the digital switch 106. For example, each of the raster image processors 103 may be implemented in a server existing within a card in a bank of servers as can be appreciated. Such servers may comprise, for example, a server computer or like system. Such servers may be located in a single installation or may be dispersed among many different geographical locations.

Each of the frame brokers 109 is a processor based device with very large amounts of high speed memory. Such memory may comprise, for example, random access memory or other similar memory component. The operation of each of the frame brokers 109 is controlled by an internal frame broker application or other applications.

Each of the printers 116 comprises, for example, a commercial grade, large scale, high speed printer. Such printers 116 can be configured to print documents 101 in "frames" 119. Specifically, each document 101 is expressed in terms of separate sections known as frames 119. As discussed herein, according to one embodiment, a frame 119 may be considered the atomic unit of print data that is fed to the printers 116 for printing. That is to say, according to one embodiment, the printers 116 are configured to accept full frames 119 of data at a time and cannot print partial frames 119.

A given document 101 might be very large. In order to ensure that such a large document 101 is processed with sufficient speed so as to provide a continuous supply of frames 119 to a printer 116 during printing, the document 101 may be split into partitions 123. Each partition 123 may comprise one or more frames 119.

The printers 116 often print one or more documents 101 in so called "runs" in which once the printing of frames 119 of a document 101 has begun, frames 119 should be continuously supplied to the printer 116 as the printing function is not easily stopped. The print data must be supplied to the printer 116 in a timely manner in order to maintain the printing function.

The digital switch 106 and the digital switch 113 are suitable high speed switches that facilitate the communication of the very large data files between raster image processors 103 and the frame brokers 109, and between the frame brokers 109 and the printers 116. To this end, the digital switches 106 and 113 may operate in the order of gigabytes per second or other appropriate number. Ultimately, the digital switches 106 and 113 are selected so as to provide enough speed to communicate items from point to point within a proper time period as will be described. Also, in one embodiment, the digital switches 106 and 113 may comprise a single switch assuming that such a switch has enough input and output ports to accommodate all devices in the print network 100.

The print network 100 further includes a central control system 133. The central control system 133 may be implemented, for example, on a server such as a server in a server bank with the raster image processors 103 or other server as can be appreciated. The central control system 133 orchestrates a progression of the frames 119 of documents 101 through the raster image processors 103 and the frame brokers 109 to the printers 116 as will be described. The frames 119 may be processed in groups depending upon the partitioning of a document 101 as will be described. The central control system 133 includes a memory 136 in which frame tracking data 139 is stored. The frame tracking data 139 is maintained by the central control system 133 in order to facilitate the orchestration of the progression of frames 119 of documents 101 as will be described.

Next, a general description of the operation of the various components of the print network 100 is described. To begin, one or more documents 101 are split up into a number of partitions 123 to be processed and printed. Each partition 123 may include one or more frames 119. In this example, the document 101 is very large and is to be raster image processed by multiple raster image processors 103 in parallel thereby embodying the document 101 in a raster image processed format that is compatible with or recognizable by printers 116.

Assuming that the document 101 is large, then it is preferable to split the document 101 up into partitions 123 that are raster image processed separately by multiple raster image processors 103. This represents a parallelization of the raster image processing for a given document 101 as can be appreciated. Given that raster image processing tends to be a detailed and long process, the parallelization of the raster image processing for documents 101 ultimately speeds up the process.

Each of the raster image processors 103 generates a raster processed partition 159 that is temporarily stored in a corresponding memory such as a cache memory associated with each respective one of the raster image processors 103. The digital switch 106 facilitates data communication between each one of the raster image processors 103 and any one of the frame brokers 109. As mentioned above, a very large document 101 may be partitioned into multiple partitions 123 that are raster image processed in parallel, thereby producing multiple raster processed partitions 159. Such raster processed partitions 159 are thus generated in roughly the same timeframe, but in an unpredictable manner. Consequently, the same must be temporarily stored such that the frames 119 included therein can be fed sequentially to one or more of the printers 116 in a desired order when necessary to implement printing of the document 101. Sequential printing of frames 119 according to a desired order may be necessary, for example, in the case that a document 101 has numbered pages as opposed to the mass printing of a single page document 101.

A frame 119 may comprise a specific number of pages to be printed, where such pages may comprise, for example, a 30×30 inch sheet or other type of frame 119 as can be appreciated. Oftentimes, printed matter is included within a given frame 119 and ultimately is cut out of a frame 119 before being used for other purposes such as book binding, etc. A frame 119 may include multiple pages of a book or other printed item as can be appreciated. In any event, each of the partitions 123 may include one or more of the frames 119 that make up the document 101. Thus, each of the raster processed partitions 159 may include one or more frames 119 as well. To this end, the frames 119 are grouped in each of the partitions 123 and the raster processed partitions 159. Once each of the raster image processors 103 generates a raster processed partition 159 from a given partition 123, then the raster processed partition 159 is temporarily stored in a cache memory or other type of memory associated with or accessible to the raster image processor 103.

Once a raster processed partition 159 has been generated, the respective raster image processor 103 then sends a request to the central control system 133 as to which frame broker 109 is to receive the raster processed partition 159. In response, the central control system 133 examines the frame tracking data 139 to determine which frame broker 109 is appropriate to receive the raster processed partition 159.

In order to make such a determination, the central control system 133 may identify the frame broker 109 that has a maximum amount of available or empty memory within which to store the raster process partition 159. In addition, other factors may be considered such as the distribution of data traffic over the digital switches 106/113 or other network components or whether frames 119 need to be aligned for a given side of a document on a single frame broker 109. Alternatively, the decision as to which frame broker 109 may be used to store the raster processed partition 159 may depend upon other criteria. In situations where frame brokers 109 are dedicated to specific printers 116, then the central control system 133 may determine which frame broker 109 is to receive the raster processed partition 159 based upon the printer 116 that is to perform the printing of the document 101.

Once the central control system 133 determines the frame broker 109 that is to receive the respective raster processed partition 159, it sends a message to the respective raster image processor 103 directing the raster image processor 103 to send the raster processed partition 159 to the identified frame broker 109. To this end, each raster image processor 103 is capable of sending a raster processed partition 159 to any one of the frame brokers 109 through the digital switch 106.

Thereafter, the raster image processor 103 sends a message to the respective frame broker 109 that is to receive the raster processed partition 159 that indicates the parameters associated with the raster processed partition 159 to be sent. To this end, the message may include a copy of the header associated with the raster processed partition 159 and other information. Such information included may comprise, for example, the file size associated with the raster processed partition 159, a document identifier that associates the raster processed partition 159 with a given document 101, the number of frames 119 contained within the raster processed partition 159, the order of each frame 119 relative to the other frames 119 of the document 101, or any other information as can be appreciated.

In one embodiment, upon receiving the message from the raster image processor 103, a given frame broker 109 makes a determination as to whether the raster processed partition 159 may be accommodated in its memory. To this end, each frame broker 109 maintains a queue that lists the raster processed partitions 159 that are waiting to be sent from respective raster image processors 103 to the frame broker 109. If there are no entries in the queue and/or there is enough memory space to accommodate the respective raster processed partition 159 to be sent, then the frame broker 109 sends a reply to the request from the raster image processor 103 to go ahead and send the raster processed partition 159 to the frame broker 109.

On the other hand, if there are currently other raster processed partitions 159 indicated in the queue of the frame broker 109 such that there is not enough memory space to accommodate the respective raster processed partition 159, then the current raster processed partition 159 to be sent to the frame broker 109 is placed in the queue so that the frame broker 109 can request the corresponding raster image processor 103 to send the raster processed partition 159 at a later time. To this end, the current frames 119 stored within the frame broker 109 are presumably in the process of being sent to one or more printers 116 at the direction of the central control system 133. As these frames 119 are successfully printed by printers 116, they are deleted from the frame broker 109, thereby opening up memory space to receive further raster processed partitions 159 from respective raster image processors 103. To the extent that a frame broker 109 is not capable of receiving raster processed partitions 159 from raster image processors 103 due to a lack of available memory space, then the frame broker 109 sends a message back to the respective raster image processor 103 that directs the raster image processor 103 to hold the raster processed partition 159 until the frame broker 109 calls upon the raster image processor 103 to send the raster processed partition 159 in the future. Alternatively, central control system 133 may communicate with the frame brokers 109 periodically to obtain information as to the available memory and other status information about each frame broker 109. In such case, the central control system 133 may be configured to maintain an up-to-date status of each frame broker 109 including the available memory and other information. With this information, the central control system 133 may direct the raster image processor 106 to send the raster processed partition 159 directly to the respective frame broker 109 without a message to determine whether the frame broker 109 has available memory space for the raster processed partition 159.

If a raster image processor 103 must hold a raster processed partition 159 in its cache memory for a period of time, the raster image processor 103 may have to suspend its raster image processing function for future partitions 123 if there is not enough local cache memory available to store additional raster processed output. Note where the local memory of the raster image processor 103 comprises a data storage device such as a high speed hard drive, this situation is less likely to occur. Where the central control system 133 directs a raster image processor 103 to send a raster processed partition 159 to one of the frame brokers 109 as described above, the central control system 133 may communicate with a raster image processor 103 instructing it to suspend its raster image processing function and hold a raster processed partition 159 if no frame broker 109 is available to receive the raster processed partition 159. Where a given raster image processor 103 has significant amounts of local memory, the raster image processor 103 may continue to perform raster image processing if there is enough memory to hold the resulting partial or whole raster processed partitions 159.

In addition, the raster image processors 103 may store a copy of the raster processed partition 159 in a separate memory location such as a hard drive or other type of location that provides nonvolatile storage. This copy may be maintained until it is confirmed that the document 101 has been printed by a printer 116. This is done so that if data such as raster processed partitions 159, frames 119, or other data is lost due to power loss or other anomalies, a copy of the same is still available to resend.

In addition, the print network 100 also includes a post raster image process (RIP) storage 173 in which raster processed partitions 159 may be stored instead of being sent to a frame broker 109 in some situations. This may be done, for example, where the printing of an uncritical document 101 may be delayed until times of lesser print activity on the print network 100.

Once a frame broker 109 receives a raster processed partition 159, it identifies the frames 119 included therein and sends a message to the central control system 133 informing it of the frames 119 that it received from the respective raster image processor 103. The frames 119 may be identified in terms of a document identifier of the document 101 to which the frames 119 belong as well as the order of the frame 119 relative to the other frames 119 for the document 101. The order may be needed so that the central control system 133 may direct respective frame brokers 109 to send frames 119 to a printer 116 in an appropriate order so that the frames 119 are printed in order and result in an appropriate stack or roll order at the output of the printer 116.

Upon receiving the information from the frame broker 109 about a received raster processed partition 159, the central control system 133 updates the frame tracking data 139 so that it has current information as to where each frame 119 associated with a document 101 is stored.

Finally, each printer 116 monitors the amount of print data that it has at any one time during the printing of documents 101. If a printer 116 determines it needs further frames 119 during the printing of a document 101, the printer 116 sends a request to the central control system 133 for the next frames 119 to be printed. In response, the central control system 133 looks up the location of the requested frames 119 in the frame tracking data 139. Specifically, the central control system 133 determines which frame broker 109 holds the next frames 119 for the document 101.

Once this is determined, the central control system 133 sends a message to the respective frame broker 109 directing it to transmit the respective frames 119 to the requesting printer 116. Given that the frame brokers 109 may be built using very fast random access memory to store the frames 119, such frames 119 may be quickly transmitted to the printer 116 before the printer 116 runs out of print data. To this end, frames 119 are available for a printer 116 during the printing of the document 101 and may be delivered just in time to the printer 116 without interrupting the printing function. This is significant given that the printers 116 can print thousands of pages per minute as can be appreciated. Note that the fact that frames 119 can be supplied as needed to the printers 116 in a timely manner means that the printers 116 may employ reduced amounts of random access buffer memory at their inputs.

In addition, the print network 100 provides the advantage of scalability. Specifically, the central control system 133 is configured to interact with a variable number of raster image processors 103, frame brokers 109, and printers 116. According to one embodiment, in order to expand the number of raster image processors 103, frame brokers 109, and/or printers 116 in the print network 100, the central control system 133 is simply made aware of the existence of such new components by adding them to component lists, etc. In one embodiment, this is accomplished without rewriting code in the central control system 133. Such scalability provides flexibility in that a print network 100 may be created for any number of existing printers 116 in a given installation without the need to specifically encode or otherwise create a custom print network 100 for such installations.

Figure 2:
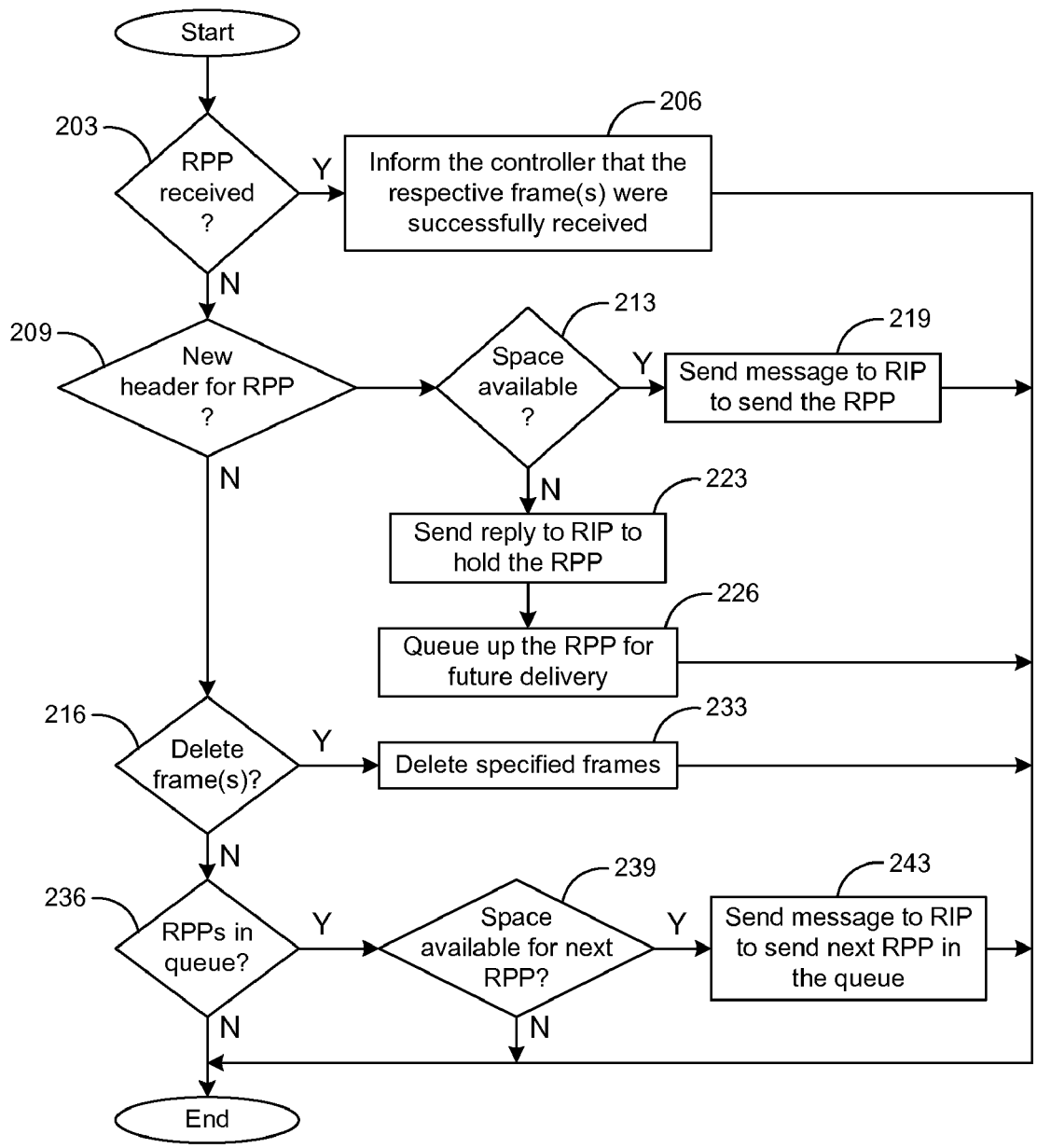
FIG. 2 is a flowchart that provides one example of various functions performed by a frame broker implemented in the print network of FIG. 1 according to an embodiment of the present disclosure.

Referring next to FIG. 2, shown is a flowchart that provides one example of functions implemented by each of the frame brokers 109 (FIG. 1) according to an embodiment of the present disclosure. Alternatively, the flowchart of FIG. 2 may be viewed as depicting steps of an example of a method implemented by a frame broker 109 to temporarily store frames 119 (FIG. 1) of a document 101 (FIG. 1) before printing. According to one embodiment, the flowchart of FIG. 2 is repeated each time an event occurs at the frame broker 109 requiring action as will be described. In addition, in another embodiment, some of the functions described below as being performed by the frame broker 109 may alternatively be performed by the central control system 133.

Beginning with box 203, the frame broker 109 determines whether a raster processed partition 159 (FIG. 1) that includes one or more frames 119 has been received from a given one of the raster image processors 103 (FIG. 1) as described above. If so, then the frame broker 109 progresses to box 206. Otherwise, the frame broker 109 progresses to box 209. In box 206, the frame broker 109 informs the central control system 133 (FIG. 1) that the one or more frames 119 included in the raster processed partition 159 have successfully been received. To this end, the frame broker 109 examines the raster processed partition 159 to identify the specific frames 119 included therein. Thereafter, the frame broker 109 ends as shown.

Assuming that the frame broker 109 progresses to box 209, then it is determined whether a new header or message with information similar to that in the header for a given raster processed partition 159 has been received from a given one of the raster image processors 103. If so, then the frame broker 109 progresses to box 213. Otherwise, the frame broker 109 progresses to box 216.

In box 213, the frame broker 109 determines whether there is memory space available in its memory to store the raster processed partition 159. This may be determined by examining how much file space is needed for the raster processed partition 159 as indicated in the header or message received from the raster image processor 103 and determining whether adequate memory space is available within the memory of the frame broker 109. Alternatively, the frame broker 109 may first examine whether there are already raster processed partitions 159 listed in the queue of the frame broker 109 indicating that the frame broker 109 has already placed the transmission of raster processed partitions 159 on hold due to a lack of memory storage space. In such case, it is assumed that there is no storage space for the currently considered raster processed partition 159 and it is included in the queue. Note that in some cases, some raster processed partitions 159 may be accepted by a frame broker 109 even though there is currently inadequate memory space if it is known that the memory space will become free before the raster processed partition 159 is complete or has been fully communicated to the frame broker 109.

If the frame broker 109 determines it can store the raster processed partition 159 in box 213, then the frame broker 109 progresses to box 219 in which a message is sent to the raster image processor 103 to send the raster processed partition 159 that includes one or more frames 119 as described above. On the other hand, if the memory space is not available, then in box 213, a reply is sent to the raster image processor 103 in box 223 to hold the raster processed partition 159 and the frames 119 contained therein. Thereafter, in box 226, the frame broker 109 queues up the raster processed partition 159 that includes the respective frames 119 for future delivery from the raster image processor 103 when space is available in the frame broker 109. Thereafter, the frame broker 109 ends.

In response to a message to hold, the raster image processor 103 maintains the raster processed partition 159 in local memory such as a memory cache associated with the raster image processor 103 as described above. Also, if there is not enough of this local memory to continue raster image processing of new partitions 123, then the operation of the raster image processor 103 may be temporarily suspended until the local memory becomes available.

In box 216, the frame broker 109 indicates whether it is to delete frames 119 stored in its random access memory. This may be determined due to the fact that a directive has been received from the central control system 133 to delete certain frames 119 as the document 101 associated with such frames 119 has already been printed on a respective one of the printers 116 or other reasons mandate that such frames 119 be deleted. Assuming that frames 119 are to be deleted, then in box 233 the frame broker 109 deletes the frames 119 from the memory, thereby opening memory space for the storage of further raster processed partitions 159. Thereafter, the frame broker 109 ends as shown.

Assuming that no frames 119 are to be deleted in box 216, then the frame broker 109 proceeds to box 236 in which it is determined whether frames 119 exist in the queue for the frame broker 109. If so, then the frame broker 109 progresses to box 239 to determine whether space is available for the next raster processed partition 159 to be received from a given raster image processor 103. If so, the frame broker 109 progresses to box 243. In this manner, the frame broker 109 repeatedly checks to see if it can receive the next raster processed partition 159 that was previously put on hold as memory space in the frame broker 109 becomes available. Otherwise, the frame broker 109 ends as shown.

In box 243, the frame broker 109 sends a message to a respective raster image processor 103 to send the next raster processed partition 159 to the frame broker 109 for storage. Thereafter, the frame broker 109 ends.

Figure 3:
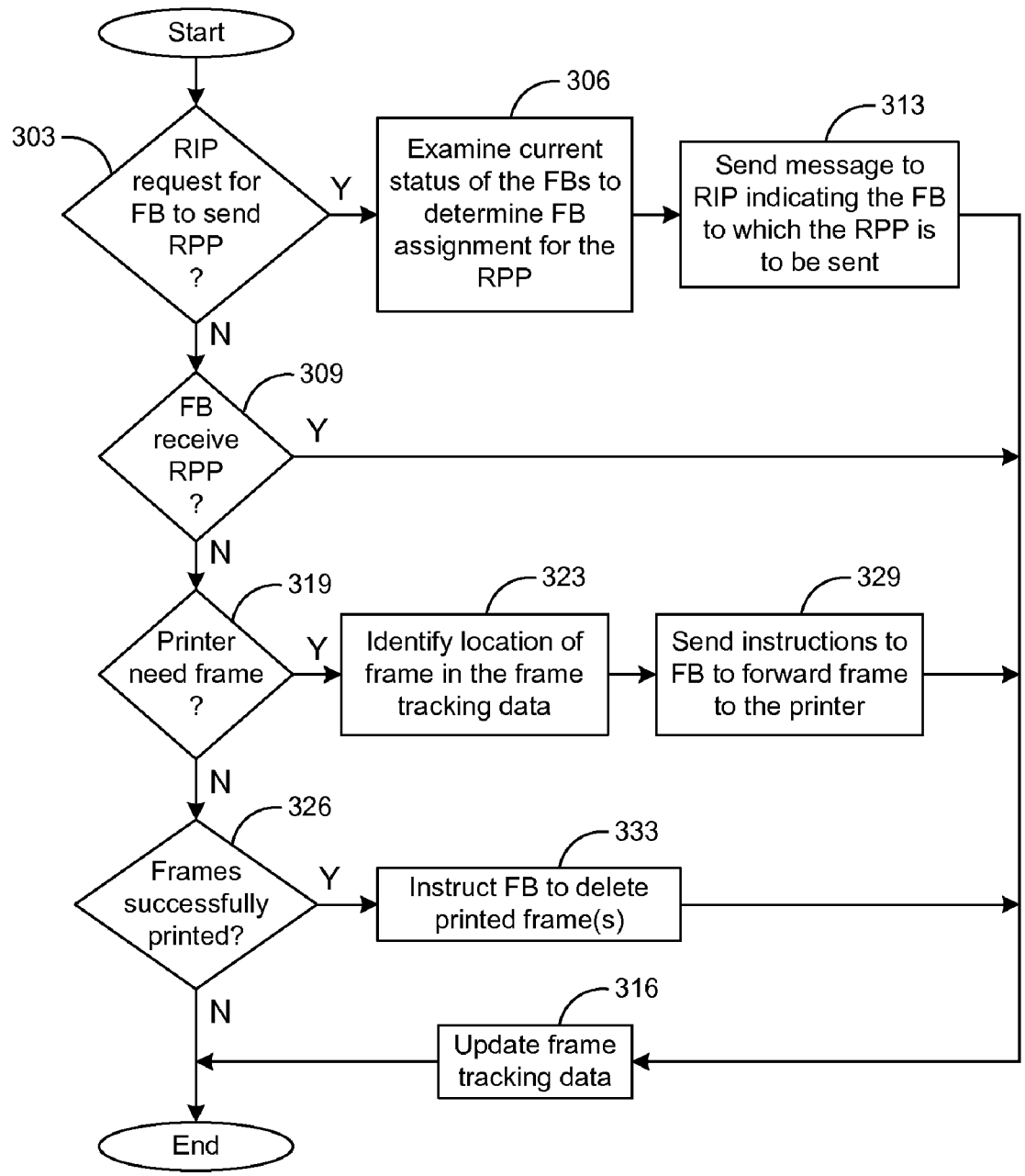
FIG. 3 is a flowchart that provides one example of various functions performed by a central control system implemented in the print network of FIG. 1 according to an embodiment of the present disclosure.

Referring next to FIG. 3, shown is a flowchart that provides one example of functions implemented by each of the central control system 133 (FIG. 1) according to an embodiment of the present disclosure. Alternatively, the flowchart of FIG. 3 may be viewed as depicting steps of an example of a method implemented by the central control system 133 to orchestrate the operation of the print network 100 (FIG. 1). According to one embodiment, the flowchart of FIG. 3 is repetitive in nature and is run each time an event occurs at the central control system 133 requiring action as will be described. To this end, the flowchart of FIG. 3 depicts functionality that is implemented each time a central control system 133 receives a message or response from various other components in the print network 100 according to various embodiments.

Beginning with box 303, the central control system 133 determines whether a message received was a request from a raster image processor 103 (FIG. 1) to receive an assignment of a frame broker 109 (FIG. 1) to which a raster processed partition 159 (FIG. 1) is to be sent. If so, then the central control system 133 progresses to box 306. Otherwise, the central control system 133 proceeds to box 309. In box 306, the central control system 133 examines the current status of the frame brokers 109 to identify a frame broker 109 to which the raster processed partition 159 is to be assigned.

To this end, the central control system 133 may examine the frame tracking data 139 to identify the frame broker 109 that has the most available memory space. Alternatively, other criteria may be employed to determine the respective frame broker 109 that is to receive the raster processed partition 159 from the requesting raster image processor 103. Thereafter, in box 313, the central control system 133 sends a message to the respective raster image processor 103 indicating the frequency broker 109 to which the raster processed partition 159 is to be sent.

The central control system 133 then progresses to box 316 in which the frame tracking data 139 is updated to indicate the assignment for the raster processed partition 159. Note, however, that this does not mean the raster processed partition 159 is actually stored in the frame broker 109 as of yet as will be described. Once the frame tracking data 139 has been updated in box 316, then the central control system 133 ends as shown.

Assuming, however, that the central control system 133 has progressed to box 309, then the central control system 133 determines whether a message has been received from a frame broker 109 informing the central control system 133 that a given raster processed partition 159 has been received from a respective one of the raster image processors 103. To this end, the message would include the information about the frames 119 (FIG. 1) within the raster processed partition 159 that was received. In particular, such information would indicate the document identifier associated with the document 101 (FIG. 1) of which the frames 119 within the raster processed partition 159 are a part. Also, an order identifier may be associated with each of the frames 119 to indicate the order by which such frames 119 are to be printed relative to the other frames 119 associated with the same document 101. In addition, other information may be included in such message indicating that the raster processed partition 159 was received and stored in the frame broker 109. Thereafter, the central control system 133 progresses to box 316 to update the frame tracking data 139 by including such information about the frames 119 that were recently stored in the frame broker 109. To this end, the frame tracking data 139 allows the central control system 133 to find the respective frames 119 when the time comes for printing as will be described.

If the communication received by the central control system 133 did not indicate that a frame broker 109 has received one or more frames 119 in the form of a raster processed partition 159 in box 309, then the central control system 133 progresses to box 319 in which it is determined whether such communication indicates that a printer 116 wishes to receive a given frame 119 for printing. To this end, the printer 116 is not aware of which frame broker 109 holds the next frame 119 to be printed, nor does the printer 116 need to be aware of from where the next frame is coming, or aware of the ordinal position of the frame within the print job. Assuming that a printer 116 has in fact requested the next frame 119 for printing in box 319, then the central control system 133 progresses to box 323. Otherwise, the central control system 133 progresses to box 326.

In box 323, the central control system 133 identifies the location of the requested frame 119 in the frame tracking data 139. Thereafter, in box 329, a central control system 133 sends instructions to the respective frame broker 109 in which the desired frame 119 is stored to forward the frame 119 to the requesting one of the printers 116. Thereafter, the central control system 133 proceeds to box 316 to update the frame tracking data 139 to indicate that a given frame 119 was to be forwarded to a respective printer 116. Thereafter, the central control system 133 ends as shown.

In box 326, the central control system 133 determines whether one or more frames 119 have successfully been printed by a given printer 116. This may be determined, for example, by receiving a message from a printer 116 that indicates that a frame 119 has successfully been printed. Assuming that a frame 119 was successfully printed in box 326, then in box 333, the central control system 133 looks up in the frame tracking data 139 where the respective frame 119 that was printed is stored in a respective one of the frame brokers 109.

To this end, once such frame broker 109 has been identified, then the central control system 133 sends a message to the respective frame broker 109 to delete the printed frame 119. In this manner, space is made available in the frame broker 109 for the next one of the raster processed partitions 159 as described above. Thereafter, the central control system 133 progresses to box 316 to update the frame tracking data 139 to indicate that such frame 119 has been deleted from the frame broker 109. In noting the deletion of the frame 119, the record of the frame 119 may actually be deleted from the frame tracking data 139. Thereafter, the central control system 133 ends as shown.

Figure 4:
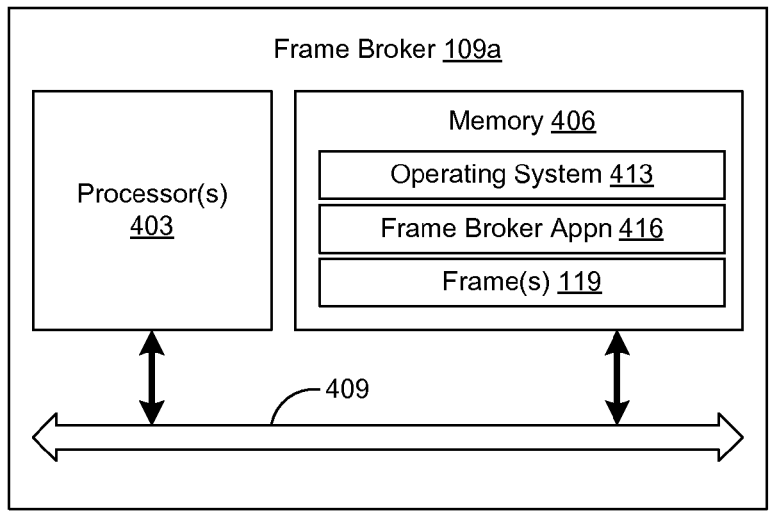
FIG. 4 is a drawing of one embodiment of a frame broker implemented in the print network of FIG. 1 according to an embodiment of the present disclosure.

Referring next to FIG. 4, shown is a schematic block diagram of one example of the frame broker 109a according to an embodiment of the present disclosure. The frame broker 109a includes a processor circuit, for example, having a processor 403 and a memory 406, both of which are coupled to a local interface 409. To this end, the frame broker 109a may comprise, for example, a server computer or other device with like capability. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are an operating system 413, a frame broker application 416, and potentially other applications. The frame broker application 416 is executed to perform the various functions of the frame broker 109 as described above. Also, stored in the memory 406 are the frames 119 and other data. Such data is stored so as to be accessible to the processor 403. It is understood that there may be other applications that are stored in the memory 406 and are executable by the processor 403 as can be appreciated. Also, other data may be stored in the memory 406 and accessed by the processors 403.

Figure 5:
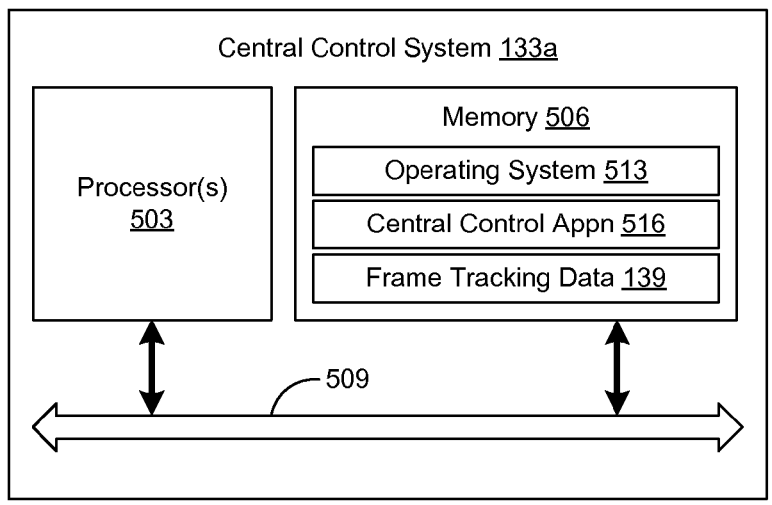
FIG. 5 is a drawing of one embodiment of a central control system implemented in the print network of FIG. 1 according to an embodiment of the present disclosure.

Referring next to FIG. 5, shown is a schematic block diagram of one example of the central control system 133a according to an embodiment of the present disclosure. The central control system 133a includes a processor circuit, for example, having a processor 503 and a memory 506, both of which are coupled to a local interface 509. To this end, the central control system 133a may comprise, for example, a server computer or other device with like capability. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are an operating system 513, a central control application 516, and potentially other applications. The central control application 516 is executed to perform the various functions of the central control system 133 as described above. Also, stored in the memory 506 is the frame tracking data 139 and other data. Such data is stored so as to be accessible to the processor 503. It is understood that there may be other applications that are stored in the memory 506 and are executable by the processor 503 as can be appreciated. Also, other data may be stored in the memory 506 and accessed by the processors 503.

Figure 6:
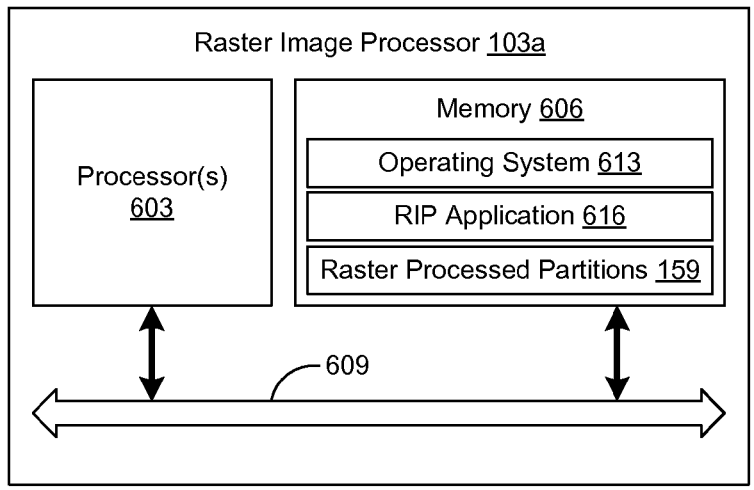
FIG. 6 is a drawing of one embodiment of a raster image processor implemented in the print network of FIG. 1 according to an embodiment of the present disclosure.

Referring next to FIG. 6, shown is a schematic block diagram of one example of the raster image processor 103a according to an embodiment of the present disclosure. The raster image processor 103a includes a processor circuit, for example, having a processor 603 and a memory 606, both of which are coupled to a local interface 609. To this end, the raster image processor 103a may comprise, for example, a server computer or other device with like capability. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are an operating system 613, a raster image processing application 616, and potentially other applications. The raster image processing application 616 is executed to perform the various functions of a raster image processor 103 as described above. Also, stored in the memory 606 are the raster processed partitions 159 and other data. Further, a partition 123 applied to a raster image processor 103 may be stored in the memory 606 after it has been received. Such data is stored so as to be accessible to the processor 603. It is understood that there may be other applications that are stored in the memory 606 and are executable by the processor 603 as can be appreciated. Also, other data may be stored in the memory 606 and accessed by the processors 603.

Referring next to FIGS. 4-6, as described above, a number of software components are stored in the memories 406, 506, 606 and are executable by the processors 403, 503, 603. In this respect, the term "executable" means a program file that is in a form that can ultimately be run by a processor 403, 503, 603. Examples of executable programs may be, for example, a compiled program that can be translated into machine code in a format that can be loaded into a random access portion of a memory 406, 506, 606 and run by a processor 403, 503, 603, source code that may be expressed in proper format such as object code that is capable of being loaded into a random access portion of a memory 406, 506, 606 and executed by a processor 403, 503, 603, or source code that may be interpreted by another executable program to generate instructions in a random access portion of a memory 406, 506, 606 to be executed by a processor 403, 503, 603, etc. An executable program may be stored in any portion or component of a memory 406, 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Further, as contemplated herein, the term "memory" (including each of the memories 406, 506, 606) is defined herein as comprising both volatile and nonvolatile memory and data storage components. Volatile components are those that do not retain data values upon loss of power. Nonvolatile components are those that retain data upon a loss of power. Thus, each memory 406, 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 403, 503, 603 may represent multiple processors and each of the memories 406, 506, 606 may represent multiple memories that operate in parallel processing circuits, respectively. In such a case, each of the local interfaces 409, 509, 609 may be an appropriate network that facilitates communication between any two of the multiple processors, between any processor and any of the memories, or between any two of the memories, etc. The processors 403, 503, 603 may be of electrical or of some other available construction.

Each of the operating systems 413, 513, 613 is executed to control the allocation and usage of hardware resources such as the memory, processing time, and peripheral devices in their respective devices. In this manner, the operating systems 413, 513, 613 serve as the foundation on which applications depend as is generally known by those with ordinary skill in the art.

The various applications such as the frame broker application 416, the central control application 516, and the raster image processing application 616 described above may be implemented using any one or a combination of a number of programming languages such as, for example, C, C++, C#, Visual Basic, VBScript, Java, JavaScript, Groovy, Perl, Ruby, Python, Flash, or other programming languages.

Although the frame broker(s) 109, the central control system 133, and the raster image processor(s) 103 are embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-3 show the architecture, functionality, and operation of an implementation of the frame broker 109 and the central control system 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2-3 show a specific order of execution, it is understood that the order of execution may differ from that which is depicted. For example, the order of execution of two or more blocks may be scrambled relative to the order shown. Also, two or more blocks shown in succession in FIG. 2 or 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the frame broker application 416, the central control application 516, and/or the raster image processing application 616 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the frame broker application 416, the central control application 516, and/or the raster image processing application 616 for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
   separating a document to be printed into a plurality of partitions, each partition comprising at least one frame;
   applying each of the partitions to a corresponding number of raster image processors for raster image processing to generate a corresponding number of raster processed partitions;
   sending each of the raster processed partitions to one of a plurality of brokers, wherein each of the brokers is capable of being in data communication with each of the raster image processors;
   temporarily storing each of the raster processed partitions in a respective one of the brokers, where each broker comprises a buffer memory for temporary storage of at least one of the raster processed partitions to be applied to a printer; and
   directing a respective one of the brokers to send one of the partitions to one of a plurality of printers.

2. The method of claim 1, wherein each of the raster image processors can send a raster processed partition to any one of the brokers.

3. The method of claim 1, wherein each of the brokers is in data communication with each of the printers, thereby allowing each of the brokers to send a frame to any one of the printers.

4. The method of claim 1, further comprising the step of tracking a location of each of the frames stored in the brokers.

5. The method of claim 4, wherein the frames associated in the document are arranged in a predefined order, and wherein the step of tracking the location of each of the frames stored in the brokers further comprises the step of tracking a location and an order of each of the frames.

6. The method of claim 5, further comprising the step of directing respective ones of the brokers to send the frames to a respective one of the printers for printing according to the predefined order.

7. The method of claim 1, comprising:
   for each of the raster processed partitions, selecting one of the plurality of brokers to receive the raster processed partition.

8. A system for the printing of documents, comprising:
   a plurality of raster image processors that each generate a raster frame;
   a plurality of frame brokers, separate from the raster image processors, that each receive a generated raster frame;
   a first digital switch interconnecting the raster image processors and the frame brokers;
   a plurality of printers;
   a second digital switch interconnecting the frame brokers and the printers; and
   a central control system that orchestrates a progression of frames of a plurality of documents through the raster image processors and the frame brokers to the printers.

9. The system of claim 8, wherein the central control system is configured to track the location of each frame located in the frame brokers as a portion of a respective one of documents.

10. The system of claim 8, wherein the central control system is configured to track an order of each frame located in the frame brokers relative to other frames associated with a respective one of documents.

11. The system of claim 8, wherein the central control system is further configured to direct each of the raster image processors to send at least one of the frames to a respective one of the frame brokers.

12. The system of claim 8, wherein the central control system is further configured to direct each of the frame brokers to send respective ones of the frames stored therein to a respective one of the printers for printing.

13. The system of claim 8, wherein a plurality of the frames associated with a document are stored in at least two of the frame brokers, the central control system directing the frame brokers to send the frames associated with the document to a respective one of the printers, the frames being sent to the respective one of the printers in a predefined order.

14. The system of claim 8, wherein each of the frame brokers is configured to control when groups of the frames are received from a given one of the raster image processors.

15. The system of claim 8, wherein each of the frame brokers maintains a queue of groups of at least one frame that have yet to be received from respective ones of the raster image processors.

16. The system of claim 8, wherein each of the frame brokers can receive a generated raster frame from at least two different ones of the raster image processors.

17. An arrangement for the printing of documents, comprising:
   a plurality of raster image processors;
   a plurality of frame brokers;
   a first digital switch facilitating communication between the raster image processors and frame brokers;
   a plurality of printers;
   a second digital switch facilitating communication between the frame brokers and the printers; and
   a central control system that orchestrates a progression of frames of a plurality of documents through the raster image processors and the frame brokers to the printers, wherein each of the frame brokers is configured to inform the central control system that at least one of the frames has been received from a respective one of the raster image processors, the frame broker informing the central control system of a document identifier and an order identifier associated with each of the at least one of the frames.

18. An arrangement for the printing of documents, comprising:
   a plurality of raster image processors;
   a plurality of frame brokers;
   a first digital switch facilitating communication between the raster image processors and frame brokers;

a plurality of printers;
a second digital switch facilitating communication between the frame brokers and the printers; and
a central control system that orchestrates a progression of frames of a plurality of documents through the raster image processors and the frame brokers to the printers, wherein:
each of the printers is configured to request a next one of the frames associated with a document from the central control system; and
the control system being configured to look up a location of the next one of the frames in frame tracking data accessible to the central control system, and to direct a respective one of the frame brokers in which the next one of the frames is stored to send the next one of the frames to the requesting one of the printers.

19. An arrangement for the printing of documents, comprising:
a plurality of raster image processors;
a plurality of frame brokers;
a first digital switch facilitating communication between the raster image processors and frame brokers;
a plurality of printers;
a second digital switch facilitating communication between the frame brokers and the printers; and
a central control system that orchestrates a progression of frames of a plurality of documents through the raster image processors and the frame brokers to the printers, wherein the central control system is configured to direct each of the frame brokers to delete specified ones of the frames stored therein after the specified ones of the frames have been printed on at least one of the printers.

20. An arrangement for the printing of documents, comprising:
a plurality of raster image processors;
a plurality of frame brokers;
a first digital switch facilitating communication between the raster image processors and frame brokers;
a plurality of printers;
a second digital switch facilitating communication between the frame brokers and the printers; and
a central control system that orchestrates a progression of frames of a plurality of documents through the raster image processors and the frame brokers to the printers, wherein each raster image processor is configured to send a message to a respective one of the frame brokers indicating that the raster image processor has at least one frame to send to the respective one of the frame brokers, the message indicating a required amount of memory to store the at least one frame.

* * * * *